United States Patent Office 2,762,496
Patented Sept. 11, 1956

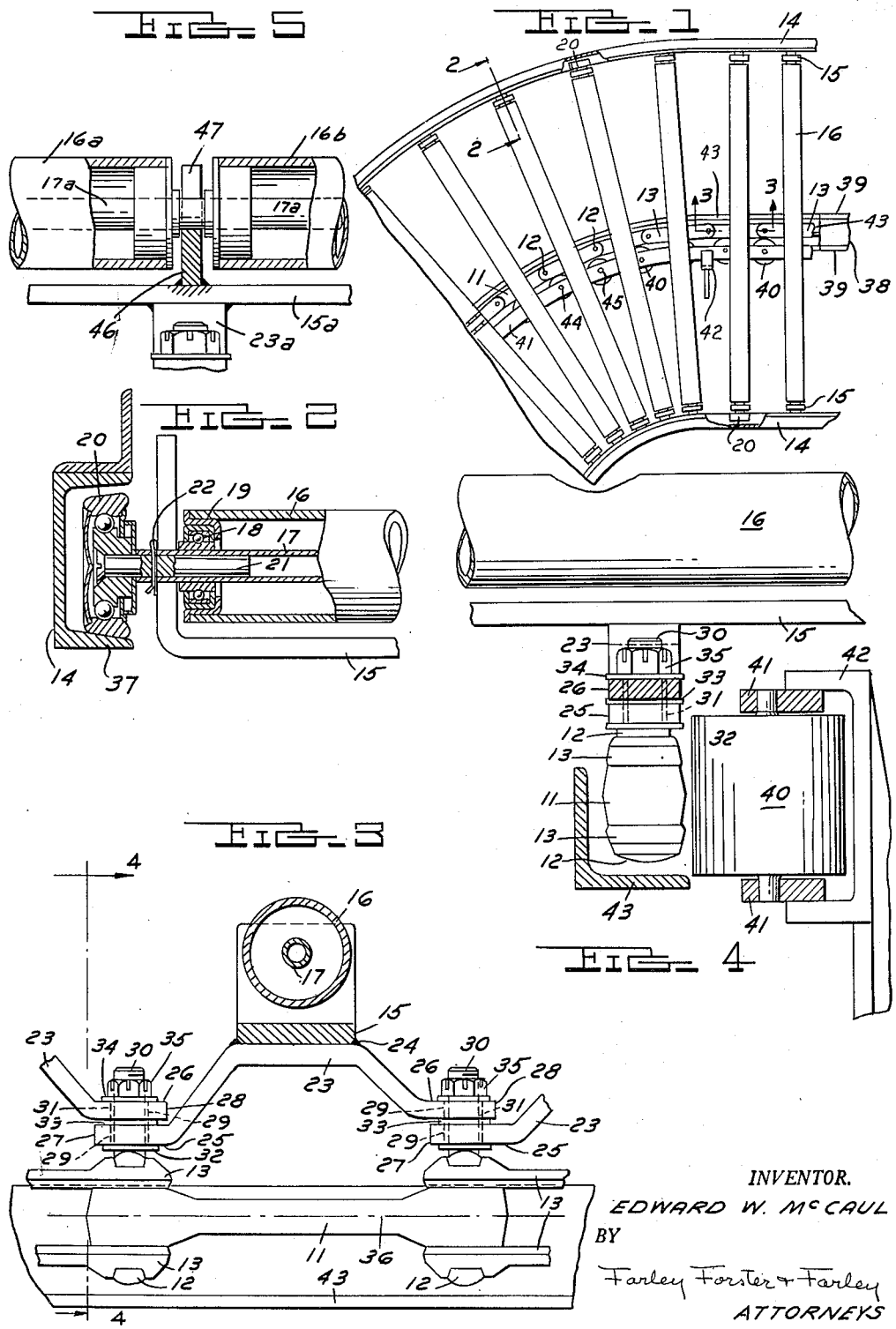

2,762,496

ROLLER FLIGHT CONVEYOR

Edward W. McCaul, Birmingham, Mich., assignor to Jervis B. Webb Company, Detroit, Mich., a corporation of Michigan Application May 31, 1952, Serial No. 290,959

3 Claims. (Cl. 198—183)

This invention relates to improvements in the construction of roller flight conveyors. Conveyors of this type conventionally are composed of a series of rollers each mounted on supporting wheels betwen a pair of tracks and secured in spaced relationship to some form of propelling device which maintains the rollers in substantial parallelism to each other and when driven carries them along the tracks. A load placed upon the conveyor is supported by a plurality of rollers which are free to rotate about the axles carrying their supporting wheels, so that the load is carried forward by the forward movement of the rollers yet can be stopped whenever desired, in which case the rollers will rotate upon their axles as they advance.

The application of this type of conveyor to material handling installations has been limited to some extent by the fact that it has always been considered necessary to fixedly maintain the rollers in parallelism to each other, which means that this type of conveyor can be employed only in straight sections and that a change in direction can be accomplished only by transferring the load to another conveyor traveling in the direction desired. Transferring requires a special station, and with large heavy loads, sometimes a special transfer mechanism to assure that the load is properly moved from one conveyor to another and this, together with the requirement for a multiplicity of conveyors has made the cost of this type of installation relatively high whenever a change of direction of conveyor travel is involved.

The improvements of the invention accomplish a solution of this problem by providing a roller flight conveyor which can travel a curved path and which at the same time offers a much simplified construction. A single driving element, preferably a strand of the conventional keystone type chain widely used in the conveyor industry, is employed and pivotal connections provided between the roller carries and the individual chain elements, such that the rollers articulate with the chain as the latter is directed around a curve. The connection between each roller flight and the chain is also such that the guiding means employed for defining the direction of travel of the chain also serve to maintain the rollers in proper position in passing through the curve, each roller then taking a position which substantially corresponds to that of a line extending radially from the center of the curve.

The invention also contemplates the use of roller flights each composed of a plurality of individually mounted roller elements so as to give each flight a differential action particularly useful in accomplishing a change of direction with relatively large span heavily loaded conveyors.

In the accompanying drawings,

Fig. 1 is a plan view showing a portion of a curved section of a conveyor constructed in accordance with the invention;

Fig. 2 is an enlarged sectional elevation taken along the line 2—2 of Fig. 1, showing the mounting of a roller carrier, roller and supporting wheel;

Fig. 3 is an enlarged sectional elevation taken along the line 3—3 of Fig. 1, showing the association between the roller carrier and the propelling chain;

Fig. 4 is a sectional elevation taken along the line 4—4 of Fig. 3, showing the association between the propelling chain and guide rollers employed to direct it around the curved section; and Fig. 5 is a view of a portion of the center of an alternate form of flight, showing the mounting of a plurality of individual rollers upon a roller carrier.

The conveyor disclosed consists of a series of roller flight assemblies, each supported between a pair of tracks and connected to a propelling member having lateral flexibility, preferably a chain of the keystone type, composed of alternate center links 11 connected at each end by headed pins 12 to a pair of side bars 13. The chain is positioned below and substantially midway between a pair of supporting tracks 14, shown in the form of opposed channel members.

Each roller flight assembly includes a U-shaped carrier 15, a roller 16, a tubular axle 17, a ball bearing 18 supporting the roller 16 between the axle 17 and an adapter member 19, and two ball bearing supporting wheel units 20, each mounted upon an axle pin 21 extending within the tubular axle 17 and connected thereto by a cotter pin 22. The supporting wheel units 20 rotate upon the tracks 14.

Each flight assembly is connected to the propelling chain through a link or connecting bracket 23 which is secured to the roller carrier 15 as by welding 24. As best shown in Fig. 3 this bracket 23 is formed with attaching flanges 25 and 26 adjacent its left and right-hand ends 27 and 28 respectively. Each flange is drilled with a hole 29, and the bracket 23 is shaped so that the left and right flanges 25 and 26 are positioned at different levels to permit the left-hand flange 25 of one bracket to overlie the right-hand flange 26 of an adjacent bracket.

The headed pins 12 of the chain are each provided with an extended cylindrical portion 30, and in the assembly of the parts this cylindrical portion 30 receives first a bushing 31, a washer 32, the left attaching flange 25 of a bracket 23, a second washer 33, the right attaching flange 26 of an adjacent bracket 23, a third washer 34 and finally a nut 35.

Each roller flight assembly, through the relationship of these parts, is maintained in a position where its longitudinal axis is normal to the longitudinal axis of each segment of the chain. For example, in Fig. 3 the center of the axle 17 is normal to the longitudinal center line 36 of the chain link 11. The center of the axle of an adjacent roller flight assembly would be normal to the longitudinal center line of the side bars 13. At the same time the position of the chain is fixed lengthwise of the roller. These relationships enable the path of the conveyor to be defined solely by the path of chain travel if desired, by the employment of suitable means for guiding and fixing the position of the chain. Preferably, however, the tracks 14 are also relied upon for defining direction of travel.

The tapered supporting flange 37 of each track 14, in combination with the tapered surface of each wheel unit 20 creates a certain degree of centering action between the pair of tracks 14 and each flight assembly. Under ideal conditions this would be enough to define the path of the conveyor on straight runs. However, the possibility of differences in frictional resistance between the wheel units 20 of any roller flight assembly, makes it desirable to employ chain guides, which may consist of a member such as the channel 38 whose flanges 39 form a barrier at either side of the desired chain position to resist any undue lateral movement or any undue articulation between chain members on a straight run.

The relationship between the chain and roller flight assembly also permits the direction of travel of the conveyor to be changed, as shown in Fig. 1, by employing suitable means for guiding and fixing the lateral position of the chain. The guiding means here employed consist of a series of spaced rollers 40 each rotatably mounted between a pair of plates 41 carried by a channel member 42 forming part of the framework of the conveyor. These rollers 40 are used in combination with a guide bar 43, of angle section, which is bent to conform to the path of curvature and which is spaced from the rollers just enough to insure free passage of the chain elements between the rollers and guide bar. Due to chain tension, the actual path of travel of the chain may be normally said to be defined by the rollers 40 while the guide bar is employed to prevent any undue radial movement of each roller flight assembly.

It is to be noted from Fig. 1 that the spacing between the pivotal axis 44 of one roller to the pivotal axis 45 of the adjacent roller is less than the spacing between the pins 12 of the conveyor chain, so that each chain segment will at all times be in contact with at least one roller in negotiating the turn.

Fig. 5 illustrates the construction of a differential type of roller flight assembly, showing the relationship between a pair of rollers 16a and 16b at the center of a roller carrier member 15a where this member is attached to a bracket 23a. The connection between these rollers at the outer ends of the roller carrier 15a is identical to that shown in Fig. 2 and previously described, but in the center, the carrier member 15a is provided with a supporting post 46 having a slot 47 which receives the single tubular axle 17a. The use of this differential roller construction will decrease the amount of sliding contact between the rollers and a load which will occur in traversing a curve section, particularly if it is desirable to stop the forward movement of the load in that section.

Specific means for driving the conveyor have not been shown. Several types of drive units are commercially available in various sizes and capacities for propelling conveyor chain of the type described. The selection of any particular type and size will depend upon the factors involved in the conveyor installation at hand, and in this respect the present type of conveyor will not ordinarily present any drive problems not unanswerable by standard conveyor practice.

The construction described and disclosed herein constitutes a presently preferred embodiment of the invention. Any modifications or alterations thereof, within the scope of the claims appended, constitute a part of this invention.

I claim:

1. A conveyor construction of the type having a series of roller flights extending generally transversely to the path of travel of said conveyor, each flight comprising a roller element rotatably carried on a common axis between a pair of supporting wheels, said wheels being supported by a pair of tracks, characterized by: a single endless propelling member positioned below and intermediate the ends of each roller flight, guide means for said propelling member to define a path of travel therefor parallel to the path of said wheel supporting tracks, and means for connecting each roller flight of the series to said endless propelling member, said means including a U-shaped carrier member connected to the roller flight at spaced points on the axis thereof, a bracket secured to the carrier member and extending at right angles thereto, said bracket being provided with attaching points for pivotal connection with the corresponding bracket of an adjacent roller flight and the endless propelling member.

2. A conveyor construction of the type having an endless series of roller flights supported by a pair of spaced tracks, each flight comprising a roller element rotatably supported between a pair of wheels on a common axle therewith, said wheels running on said tracks, characterized by: a propelling member comprising a link chain positioned below and intermediate the ends of each roller flight, means for suspending a segment of said chain from said axle at right angles thereto comprising a carrier member connected to the axle of the roller flight at spaced points between the ends of the roller element and the adjacent flight supporting wheel, said carrier member extending beneath said roller element between said points of connection of said carrier member, a bracket secured to said carrier member at right angles thereto, said bracket having a length substantially equal to the length of a link of said propelling chain, means connecting said bracket to said chain at two points of articulation thereof.

3. A conveyor construction of the type having a series of roller flights extending generally transversely to the path of travel of said conveyor, each flight comprising a roller element rotatably carried on a common axis between a pair of supporting wheels, said wheels being supported by a pair of tracks, characterized by: a single endless propelling member positioned below and intermediate the ends of each roller flight, guide means for said propelling member to define a path of travel therefor parallel to the path of said wheel supporting tracks, and means for connecting each roller flight of the series to said endless propelling member, said means including a U-shaped carrier member connected to the roller flight at spaced points on the axis thereof, a bracket secured to the carrier member and extending at right angles thereto, and means for connecting said bracket to said propelling member at right angles to a segment thereof.

References Cited in the file of this patent

UNITED STATES PATENTS

| | | |
|---|---|---|
| 385,251 | Daniels | June 26, 1888 |
| 1,566,251 | Myers | Dec. 15, 1925 |
| 2,150,320 | Edwards | Mar. 14, 1939 |